UNITED STATES PATENT OFFICE.

JOHN P. IHART, OF NEW YORK, N. Y.

METHOD OF PREPARING MATERIALS FOR PURIFYING GAS.

SPECIFICATION forming part of Letters Patent No. 680,777, dated August 20, 1901.

Application filed March 19, 1901. Serial No. 51,931. (No specimens.)

*To all whom it may concern:*

Be it known that I, JOHN P. IHART, a citizen of the United States, residing in the city, county, and State of New York, have invented a new and useful Method of Preparing Materials for Purifying Illuminating-Gas, of which the following is a specification.

My invention relates to the art of making materials suitable for removing sulfureted hydrogen from illuminating or fuel gas; and the object of my invention is to prepare a material which is as efficient as that now commonly used, can be made active in a much shorter time, and is produced at a lower cost.

The material heretofore commonly used for this purpose has been metallic iron, such as iron borings, oxidized by exposure to the action of air and water; but oxidation by this means requires a considerable length of time. I have discovered that spent pyrites (the waste from the manufacture of sulfuric acid, commonly known as "pyrites-cinders") which contain ferrous oxid and the iron ores which contain ferrous oxid can be used as a purifying material when subjected to my process.

In practicing my invention I preferably divide the pyrites-cinders or iron ore into small particles by any suitable process and spread such ore or cinders in heaps from, say, four to eight inches high. I then wet the material with an aqueous solution of the oxidizing agent—ammonium chlorid—in order to convert the ferrous oxid into ferric oxid. I have found ammonium chlorid to be an effective, cheap, and powerful oxidizing salt. A solution containing from one to two per cent. of the salt is efficient, though a stronger solution may be employed, and I use enough of the solution to thoroughly wet the different particles of the ore or cinders and coat them with the salt. The compound can be used in this state, and I advise that the solution be used several times at intervals during from three to five days.

As the carbonic acid in the gas to be purified, although a weak acid, has a tendency with the water in the purifying material to drive off the sulfur from the ferrous sulfid formed in the purification, especially where the purifying material contains much water and great speed in the purification is desired, and thus render the compound acid, I have found that the purifying material is improved by adding thereto from three to five per cent. of an alkali, either in the form of a hydrate or a carbonate. Thus calcium hydrate, sodium hydrate, barium hydrate, magnesium hydrate, &c., and calcium carbonate, sodium carbonate, &c., are suitable neutralizing agents, and I recommend that a surplus of the alkali be used in order to neutralize any free acid that may be present.

Either of the above-described compounds may be used alone as a purifying agent, or they may be mixed with sawdust or other suitable material to produce porosity and provide greater permeability for the gas in the well-known manner.

Inferior methods are to mix the oxidizing salt with the ore or cinders and subsequently add the water and the neutralizing agent, or the oxidizing salt, ore or cinders, and neutralizing agent may all be mixed together in the dry state and the water then added; but I prefer the method first described.

As pyrites-cinders and the iron ores containing ferrous oxide are all of the ore nature and are substantial equivalents of each other in my process, I include them all under the general term "iron ore" in the appended claims, although I prefer the use of pyrites-cinders.

Having thus described my invention, what I claim is—

1. The process of preparing a material for purifying gas which consists in mixing together an iron ore containing ferrous oxid, water, and ammonium chlorid, substantially as described.

2. The process of preparing a material for purifying gas which consists in mixing together an iron ore containing ferrous oxid, water, ammonium chlorid, and lime, substantially as described.

JOHN P. IHART.

Witnesses:
JAMES M. STEWART,
HARRY V. FOUNTAIN.